US005794758A

United States Patent [19]

Bakker et al.

[11] Patent Number: 5,794,758

[45] Date of Patent: Aug. 18, 1998

[54] ROLLER APPARATUS

[75] Inventors: Lynn Alan Bakker, Elkton, Md.; Chris Alan Ledeker, Newark, Del.; Ernest Lee Bailey, Elkton, Md.; John Ray Young, Newark, Del.

[73] Assignee: Scapa Group PLC, Blackburn, United Kingdom

[21] Appl. No.: 653,563

[22] Filed: May 24, 1996

[51] Int. Cl.$^{6}$ .......... B65G 13/02

[52] U.S. Cl. .......... 198/785; 198/780; 193/37

[58] Field of Search .......... 198/780, 785, 198/786; 193/37

[56] References Cited

U.S. PATENT DOCUMENTS

| | | | |
|---|---|---|---|
| 2,592,581 | 4/1952 | Lorig | 193/37 X |
| 2,651,398 | 9/1953 | McGraw | 193/37 |
| 3,174,670 | 3/1965 | Zernov | 198/780 X |
| 3,196,701 | 7/1965 | Morrow | 198/785 X |
| 3,545,582 | 12/1970 | Kimmen | 193/37 |

FOREIGN PATENT DOCUMENTS

| | | | |
|---|---|---|---|
| 166499 | 4/1964 | Australia | 198/785 |
| 1371953 | 2/1988 | U.S.S.R. | 193/37 |
| 2 030 968 | 4/1980 | United Kingdom . | |
| WO90/05103 | 5/1990 | WIPO . | |

*Primary Examiner*—James R. Bidwell

*Attorney, Agent, or Firm*—Jacobson, Price, Holman & Stern, PLLC

[57] ABSTRACT

A roller apparatus for a corrugator machine comprises a tubular mantle secured to a central core. Circumferential grooves are provided in the surface of the roller. The grooves provided at the centre of the roller are inclined at an angle "α" which is less than the angle of inclination "α" of the grooves provided at the outer regions of the roller.

10 Claims, 3 Drawing Sheets

ROLLER APPARATUS

BACKGROUND OF THE INVENTION

1. Field of the Invention

The present invention relates to a roller apparatus and preferably, but not exclusively to a feed roller ideally for corrugated board.

2. Description of the Related Art

Generally speaking, on completion of the manufacture of corrugated board, the board is directed from the corrugated machine, via a series of feed rollers, to a machine for making the corrugated board into an article such as a box. Feed rollers are also provided in equipment that converts corrugated board after manufacturing. For example, feed rollers are provided at the front end of folder/gluer/slotter machines.

Conventional feed rollers for transferring the board, generally, comprise a steel core and a mantle of soft elastomeric material. A plurality of aligned grooves may be provided in the elastomeric material. These grooves run parallel with the edge of the roller. The walls defining the grooves run vertically, i.e. perpendicular to the horizontally extending core. A cross section through the elastomeric material of a conventional roller, when not in use, is illustrated in FIG. 1. The grooves deform under pressure to provide a suitable pressure footprint which is necessary to it. achieve a good feeding action, as is illustrated in FIG. 2. However these rollers suffer from exaggerated wear in their centre regions and to compensate for the smaller diameter in this region the boardmaker has to increase the load in the roller to provide the same feeding action. As the edge sections are not as worn the board edges are crushed. The present invention has been made from a consideration of this problem of board edge crush.

SUMMARY OF THE INVENTION

According to a first aspect of the present invention there is provided a roller apparatus comprising a core and a tubular mantle located around the core, the tubular mantle having a cylindrical outer surface, a plurality of grooves being provided in the said surface of the tubular mantle, the grooves extending around the circumference of the mantle wherein, with reference to a reference plane extending perpendicular to the axis of rotation of the roller from the lateral midpoint of the roller, at least some of a first set of grooves provided adjacent the reference plane are set at a first angle to the reference plane and at least some of a second set of grooves are set at a second angle to the reference plane, the second set of grooves being spaced further from the reference plane than the first set of grooves and the second angle being larger than the first angle.

According to a second aspect of the present invention there is provided a tubular roller mantle operative to receive a core such that the tubular mantle may be located around the core, the tubular mantle having a cylindrical outer surface, a plurality of grooves being provided in the said surface of the tubular mantle, the grooves extending around the circumference of the mantle wherein, with reference to a reference plane extending perpendicular to the axis of rotation of the roller from the lateral midpoint of the roller, at least some of a first set of grooves provided adjacent the reference plane are set at a first angle to the reference plane and at least some of a second set of grooves are set at a second angle to the reference plane, the second set of grooves being spaced further from the reference plane than the first set of grooves and the second angle being larger than the first angle.

The invention allows for the roller to provide a substantially even pressure across the corrugated board both when the roller is new, and thus in an unworn state, and after the roller has been in use and the roller, and in particular the centre thereof, is in a worn state and consequently the operator applies additional load via the roller to the corrugated board to compensate for this.

The separate grooves may be provided by a series of distinct spaced apart parallel channels or by one or more spiral channels. If one or more spiral channels are provided the said angle with respect to the central reference plane will either gradually change or will change in steps.

By increasing the angle of inclination of the grooves at the edge regions of the roller the lands of the roller edges may deflect to the side to a greater extent than those at the roller centre when the pressure footprint is applied. Exceptional tracks have shown that the working life of the roller can be increased by 200% or more compared to a conventional roller.

The said first angle is preferably in the range from 0° to 40° and is ideally substantially 10°. The second angle is preferably in the range from 15° to 45°, but is always larger than the first angle. Preferably the second angle is substantially 20°. The angle of inclination of the grooves ideally increases continually or in steps from the reference plane to each end of the roller.

The width of at least some and preferably each groove is in the range from 0.125" to 0.750" and is ideally substantially 0.3125". The depth of at lest some and preferably each groove is preferably in the range from 0.125" to 1.0" and is ideally substantially 0.625".

The groove pattern is preferably symmetrical about the central plane. The angle of inclination of the set of grooves to one side of the central plane is ideally a mirror image of the set of grooves provided to the other side of the central plane.

The tubular mantle may comprise a single layer or a plurality of layers, but preferably comprises two layers. The inner layer is preferably relatively soft to reduce board crush whilst the outer surface layer would be relatively hard to protect the roll against wear.

The inner and outer layers may suitably comprise polymers such as polyurethane.

The Shore A hardness of the outer layer is preferably in the range from 40 to 95 and is more preferably substantially 70. The Shore A hardness of the inner layer is preferably in the range from 20 to 50 and more preferably from 30 to 40.

The thickness of the mantle is preferably from 5 mm to 35 mm. The thickness of the inner layer is preferably in the range from 5 mm to 20 mm and is more preferably about 9 mm. The thickness of the outer layer is preferably in the range from 0 mm to 15 mm and is more preferably substantially 10 mm. The diameter of the roller apparatus is preferably at least 80 mm and is more preferably in the range from 80 mm to 110 mm. The dual layer structure described above is adapted to reduce roll wear. The hard outer layer protects the roll against wear whilst the soft inner layer reduced board crush.

The roller apparatus may be made by casting or any other suitable method. A plurality of separate mantles may be received on a single metal roller core. However, if so, the separate mantles are acting as part of a single roller and the grooves in the mantles should be configured accordingly.

It is noted that teed rollers for making corrugator board are generally driven rollers, although the invention may relate to non-driven feed rollers.

BRIEF DESCRIPTION OF THE DRAWINGS

In order that the present invention may be more readily understood a specific embodiment thereof will now be described by way of example only with reference to the accompanying drawings in which:

FIGS. 1 and 2 have been discussed in detail hereinbefore and a further description here is not considered necessary.

DETAILED DESCRIPTION OF THE PREFERRED EMBODIMENTS

Figure 1:
FIG. 1 (PRIOR ART)
FIG. 1. is a longitudinal cross section through part of one prior art roller when not in use.
Figure 2:
FIG. 2 (PRIOR ART)
FIG. 2 is a cross section through part of the roller of FIG. 1 when in use.

Referring to FIGS. 3 to 7 a typical apparatus 10 for making double walled corrugated board comprises single facer units 11, 12 and double backer unit 13. A first fluted sheet is bonded to a flat liner sheet at the first single facer unit 11 so as to provide a first laminate 14. Similarly a second fluted sheet is bonded to a second flat liner sheet and the second facer unit 12 so as to provide a second laminate 15. The second laminate 15 passes to the double backer unit 13 at which a flat liner sheet is bonded to the other side of the fluted sheet so as to provide a double faced board 16. The flute tips of the fluted side of the first laminate 14 are then coated with adhesive by an applicator roller 17 and the first laminate 14 is bonded to the double faced board 16. The resultant double walled board then passes through a dryer unit 18. The dryer unit 18 is shown in more detail in FIG. 4. At the dryer unit 18 the double faced board 16 travels over hot plates 19. Part of an endless belt 20 is in contact with the side of the board 16 which is remote from the dryer units so as to urge the board towards the dryer units. A plurality of feed rollers 21 are provided on the face of the belt which does not make contact with the board. The rollers comprise a metal bar over each of which are located a cylindrical mantle 23.

The cylindrical mantle 23 comprises a hard polyurethane inner core 24 which gives stability and firm contact with the roller surface and a deformable polyurethane outer surface layer 23 which absorbs vibrations, reduces roller bounce and bearing wear.

Figure 6:
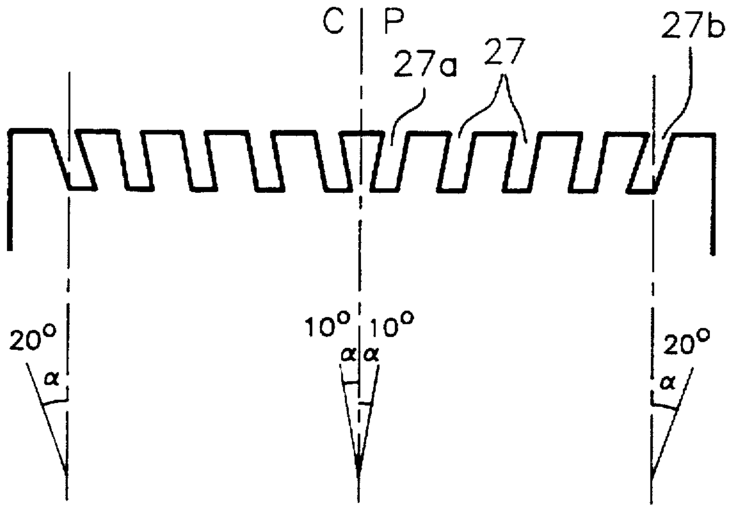
FIG. 6 is a longitudinal cross section through part of the roller of FIG. 5.
Figure 5:
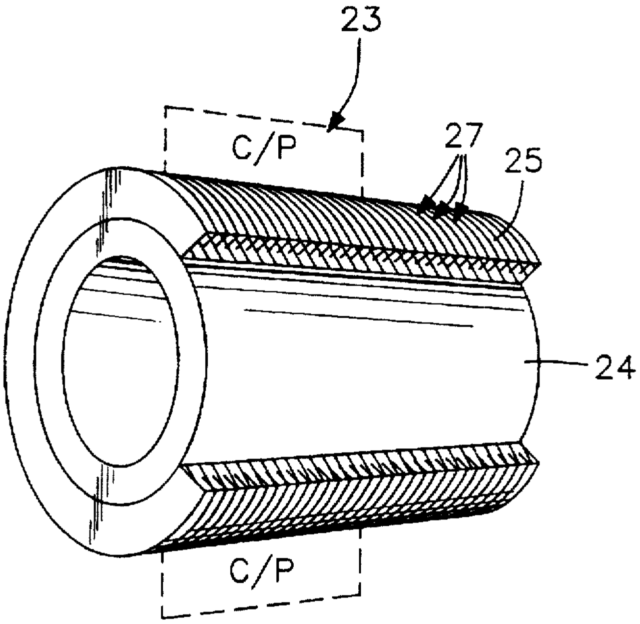
FIG. 5 is a perspective view of one feed roller in accordance with the invention.

With particular reference to FIGS. 5 and 6 a plurality of spaced apart circumferential grooves 27 are provided in the surface of the outer layer 25. In this embodiment none of the grooves 27 run vertically. Instead all of the grooves are set at an angle "α" to a central reference plane "c/p" which extends through the lateral centre of the roller.

The angle "α" at which the grooves 27 are set relative to the central reference plane "c/p" is larger for the grooves **27*b*** which are provided at the ends of the roller. Thus in this embodiment the roller comprises two sets of grooves located between the central plane and the respective roller edges, the angle "α" of orientation of the grooves increasing gradually along the length of the roller.

Figure 7:
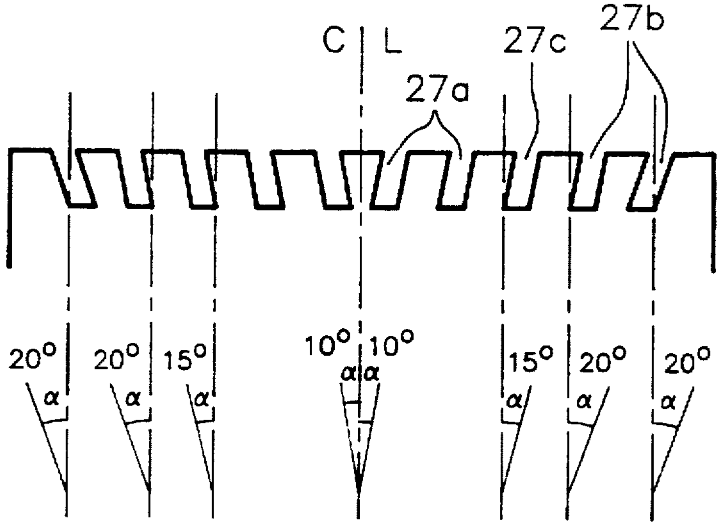
FIG. 7 is a longitudinal cross section through part of a further feed roller in accordance with the invention.
Figure 3:
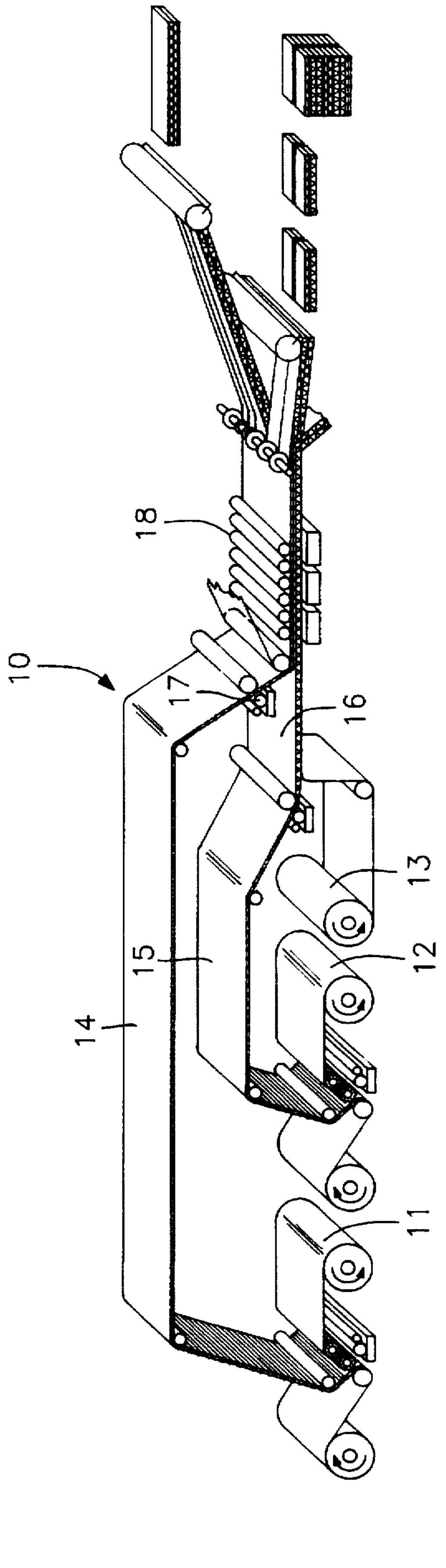
FIG. 3 shows an apparatus for making corrugated board.
Figure 4:
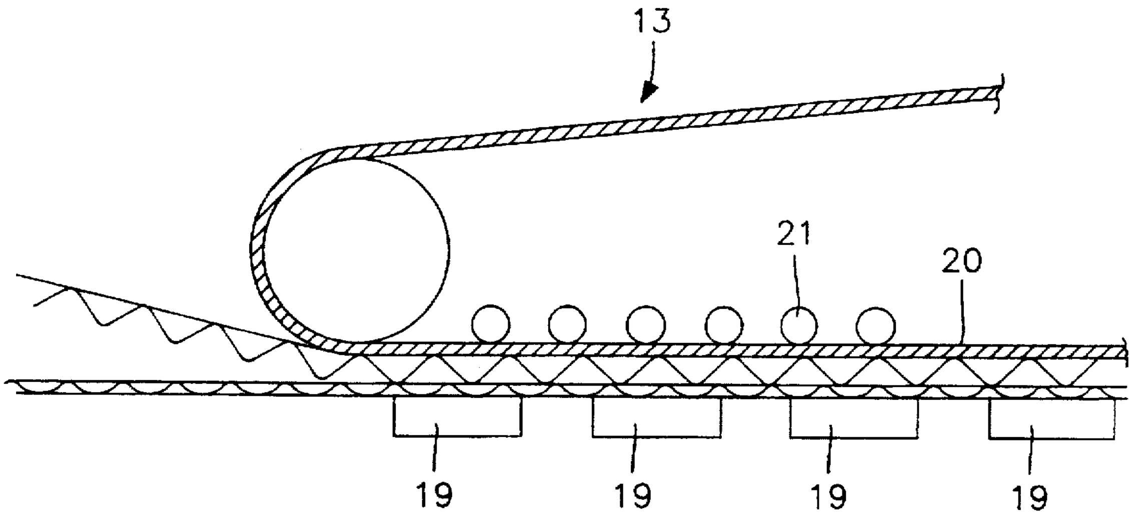
FIG. 4 shows the drying section of the apparatus of FIG. 3.

In the embodiment of FIG. 7 the angle "α" increases from the central reference plane to the edges in steps, the angle "α" of the central grooves **27*a* being substantially 10°, the angle "α" of the outer grooves 27*b*** being substantially 20° and the angle "α" of the intermediate grooves being substantially 15°.

It is to be understood that the described embodiments are by way of illustration only. Many modifications and variations are possible.

We claim:

1. A roller apparatus comprising a core and a tubular mantle located around the core, the tubular mantle having a cylindrical outer surface, a plurality of grooves being provided in the said surface of the tubular mantle, the grooves extending around the circumference of the mantle wherein, with reference to a reference plane extending perpendicular to the axis of rotation of the roller apparatus from the lateral midpoint of the roller apparatus, at least some of a first set of grooves provided adjacent the reference plane are set at a first angle to the reference plane and at least some of a second set of grooves are set at a second angle to the reference plane, the second set of grooves being spaced further from the reference plane than the first set of grooves and the second angle being larger than the first angle.

2. The roller apparatus as claimed in claim 1, wherein the first angle is in the range from 0° to 40°.

3. The roller apparatus as claimed in claim 1, wherein the said angle is in the range from 15° to 45°.

4. The roller apparatus as claimed in claim 1, wherein the angle of inclination of the said grooves continuously increases from the reference plane to the roller ends.

5. The roller apparatus as claimed in claim 1, wherein the angle of inclination of the said grooves increases in steps for the reference plane to the roller ends.

6. The roller apparatus as claimed in claim 1, wherein the width of each groove is in the range from 0.125" to 0.750".

7. The roller apparatus as claimed in claim 1, wherein the depth of each groove is in the range from 0.225" to 1.0".

8. The roller apparatus as claimed in claim 1, wherein the pattern of the grooves is symmetrical about the central reference plane.

9. The roller apparatus as claimed in claim 1, wherein the angle of inclination of the set of grooves to the side of the central plane is ideally a minimum range of that of the set of grooves proceeding to the other side thereof.

10. A tubular roller mantle operative to receive a core such that the tubular mantle may be located around the core, the tubular mantle having a cylindrical outer surface, a plurality of grooves being provided in the said surface of the tubular mantle, the grooves extending around the circumference of the mantle wherein, with reference to a reference plane extending perpendicular to the axis of rotation of mantle from the lateral midpoint of mantle, at least souie of a first set of grooves provided adjacent the reference plane are set at a first angle to the reference plane and at least some of a second set of grooves are set at a second angle to the reference plane, the second set of grooves being spaced further from the reference plane than the first set of grooves and the second angle being larger than the first angle.

* * * * *